US012242944B2

(12) United States Patent
Buhmann et al.

(10) Patent No.: US 12,242,944 B2
(45) Date of Patent: Mar. 4, 2025

(54) SIMULATED HUMAN-LIKE AFFECT-DRIVEN BEHAVIOR BY A VIRTUAL AGENT

(71) Applicant: Disney Enterprises, Inc., Burbank, CA (US)

(72) Inventors: Jakob Buhmann, Zurich (CH); Douglas A. Fidaleo, Canyon Country, CA (US); Maayan Shvo, Toronto (CA); Mubbasir Kapadia, Baden (CH); Jill Fain Lehman, Pittsburgh, PA (US); Sarah K. Wulfeck, Alameda, CA (US); Rylan Gibbens, San Diego, CA (US); Steven Poulakos, Zurich (CH); John Wiseman, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/859,958

(22) Filed: Jul. 7, 2022

(65) Prior Publication Data
US 2022/0366210 A1  Nov. 17, 2022

Related U.S. Application Data

(63) Continuation of application No. 16/210,928, filed on Dec. 5, 2018, now Pat. No. 11,416,732.

(51) Int. Cl.
*G06N 3/006* (2023.01)
(52) U.S. Cl.
CPC ................... *G06N 3/006* (2013.01)
(58) Field of Classification Search
CPC ..................................................... G06N 3/006
See application file for complete search history.

(56) References Cited

U.S. PATENT DOCUMENTS

2002/0160835 A1 * 10/2002 Fujioka ................. A63F 13/822
463/31
2008/0096533 A1 * 4/2008 Manfredi ............... G06N 3/006
455/412.1
(Continued)

FOREIGN PATENT DOCUMENTS

| CN | 106970703 | | 7/2017 |
| CN | 107340859 | A | 11/2017 |
| CN | 108886532 | A | 11/2018 |

OTHER PUBLICATIONS

Anonymous Tracking using RFID tags; Kodialam et al. copyright 2007 pp. 1217-1225.*
(Continued)

*Primary Examiner* — Sherrod L Keaton
(74) *Attorney, Agent, or Firm* — Farjami & Farjami LLP (57) ABSTRACT

A system for simulating human-like affect-driven behavior includes a hardware processor and a system memory storing software code providing a virtual agent. The hardware processor executes the software code to identify a character assumed by the virtual agent and having a personality, a target state of motivational fulfillment, a baseline mood, and emotions. The software code identifies current physical and motivational fulfillment states, and currently active emotions of the character, and determines a current mood of the character based on the baseline mood and the currently active emotions. The software code further detects an experience by the character and plans multiple behaviors including a first behavior based on the experience and the current physical state, the second behavior based on the experience, the personality, the current mood, and the currently active emotions, and a third behavior based on the target and current states of motivational fulfillment.

20 Claims, 7 Drawing Sheets

(56) References Cited

U.S. PATENT DOCUMENTS

| | | | |
|---|---|---|---|
| 2009/0177976 A1* | 7/2009 | Bokor | G06F 3/011 |
| | | | 715/753 |
| 2009/0271205 A1* | 10/2009 | Finn | G06Q 30/0281 |
| | | | 705/346 |
| 2013/0226588 A1* | 8/2013 | Irmler | G10L 13/00 |
| | | | 704/E21.001 |
| 2016/0257000 A1* | 9/2016 | Guerin | B25J 9/1671 |
| 2021/0072888 A1* | 3/2021 | Vyas | A63F 13/428 |

OTHER PUBLICATIONS

First Office Action dated Mar. 20, 2023 for Chinese Application 2019109837902.

* cited by examiner

```
1:  ε ← ∅                                              ▷ Initialization
2:  m^d, w, b ← PERSONALITYWEIGHTEDINIT(p)
3:  while true do                                      ▷ deliberation loop
4:     s ← UPDATESTATE()
5:     m^c ← UPDATECURRENTMOTIVATIONS(s, m^c)
6:     ε ← DECAYANDFILTEREMOTIONS(ε)           ▷ Eq. (2)
7:     ε ← GENERATENEWEMOTIONS(s, ε)           ▷ Eq. (6)
8:     b ← UPDATEMOOD(b, ε)                    ▷ Eq. (3)
9:     if π_GP(g_e_i) = Null then              ▷ e influencing behavior
10:       foreach e_i ∈ ε do
11:          if e_i > τ_e then                 ▷ emotional reaction
12:             g_e_i ← GENERATEEMOTIONALREACTIONGOAL(e_i)
13:             π_GP(g_e_i, s) ← SENDGOALTOPLANNER(g_e_i, s)
14:             PUBLISHPLAN(π_GP(g_e_i, s))
15:             break
16:          if I_LB < I(e_i) < τ_e then       ▷ emotion-motivation
17:             w' ← MODIFYWEIGHTVECTOR(w, e_i)  ▷ Eq. (9)
18:       if NOEXISTINGPLAN() then             ▷ main planning step
19:          π_A*(s) ← CALL A*(w', m^c, m^d, s)
20:          PUBLISHPLAN(π_A*(s))
```

Fig. 5

| Emotion | O | C | E | A | N | P | A | D |
|---|---|---|---|---|---|---|---|---|
| Joy | + |  | + |  |  | 0.4 | 0.2 | 0.1 |
| Distress | + |  |  |  | + | -0.4 | -0.2 | -0.5 |
| Resentment | + | + |  | - | + | -0.2 | -0.3 | -0.2 |
| Pity | + |  |  | + | + | -0.4 | -0.2 | -0.5 |
| Hope |  |  | + |  |  | 0.2 | 0.2 | -0.1 |
| Fear | - | + |  |  | + | -0.64 | 0.60 | -0.43 |
| Satisfaction | + |  | + |  |  | 0.3 | -0.2 | 0.4 |
| Relief |  |  | + |  |  | 0.2 | -0.3 | 0.4 |
| Disappointment | - |  |  |  | + | -0.3 | 0.1 | -0.4 |
| Pride | + |  | + |  |  | 0.4 | 0.3 | 0.3 |
| Admiration | + |  | + | + |  | 0.5 | 0.3 | -0.2 |
| Shame | - |  |  |  | + | -0.3 | 0.1 | -0.6 |
| Reproach |  |  |  | - | + | -0.3 | 0.1 | -0.6 |
| Liking | + |  | + | + |  | 0.4 | 0.16 | -0.24 |
| Disliking |  |  |  | - | + | -0.4 | 0.2 | 0.1 |
| Gratitude | + |  | + |  |  | 0.4 | 0.2 | -0.3 |
| Anger |  |  |  | - | + | -0.51 | 0.59 | 0.25 |
| Gratification | + |  | + |  |  | 0.6 | 0.5 | 0.4 |
| Remorse | + |  |  |  | + | -0.3 | 0.1 | -0.6 |
| Love | + |  | + |  |  | 0.3 | 0.1 | 0.2 |
| Hate | + |  |  | - | + | -0.6 | 0.6 | 0.3 |

A mapping between the OCC emotion types and the FFM traits (O - Openness; C - Conscientiousness; E - Extraversion; A - Agreeableness; N - Neuroticism). (+) and (-) signify, respectively, that the personality trait increases or decreases the emotion's intensity upon elicitation. An empty cell signifies no effect by the trait on the respective emotion. In addition this table shows a mapping of OCC emotion types into PAD space. Taken from ALMA (Gebhard 2005).

Fig. 6

| Emotion | Corresponding Motivations |
|---|---|
| Joy | curiosity, social-contact, eating |
| Distress | social-contact, family, idealism |
| Resentment | saving, status |
| Pity | idealism |
| Hope | idealism, curiosity |
| Fear | tranquility, order |
| Satisfaction | saving |
| Relief | tranquility, acceptance |
| Disappointment | social-contact, family, idealism |
| Pride | status, honor |
| Admiration | social-contact, honor, idealism |
| Shame | acceptance, social-contact |
| Reproach | vengeance |
| Liking | family, social-contact, romance |
| Disliking | vengeance, power |
| Gratitude | social-contact, idealism |
| Anger | vengeance, power, idealism |
| Gratification | acceptance, status, honor |
| Remorse | acceptance, idealism, tranquility |
| Love | family, social-contact, romance |
| Hate | vengeance, power |

A mapping between the OCC emotion types and their corresponding Reiss motivations.

SIMULATED HUMAN-LIKE AFFECT-DRIVEN BEHAVIOR BY A VIRTUAL AGENT

The present application is a Continuation of U.S. application Ser. No. 16/210,928, filed Dec. 5, 2018, which is hereby incorporated by reference in its entirety into the present application.

BACKGROUND

Providing a virtual social agent capable of engaging in a human-like interaction with a human user is a challenging task, at least in part because human interactions occur around a wide range of contexts. Conventional examples of interactive agents include conversational agents provided on smart electronic devices, which are able to sustain question-and-answer type conversations. However, because those conventional conversational agents are designed for the very specific function of responding to questions or requests, they omit many of the properties that a real human would offer in an interaction that make that interaction not only informative but also enjoyable or entertaining. For example, an interaction between two humans may be influenced or shaped by the personalities of those human participants, as well as the history or storyline of their previous interactions. Thus, there remains a need in the art for a virtual agent capable of engaging in an extended interaction with a human user that simulates human-like affect-driven behavior.

SUMMARY

There are provided systems and methods for simulating human-like affect-driven behavior by a virtual agent, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

The present application is directed to automated systems and methods enabling a virtual agent to simulate human-like affect-driven behavior that address and overcome the deficiencies in the conventional art.

It is noted that, as used in the present application, the terms "automation," "automated", and "automating" refer to systems and processes that do not require the participation of a human interaction editor or guide. Although, in some implementations, a human editor may review or even modify a behavior determined by the automated systems and according to the automated methods described herein, that human involvement is optional. Thus, the methods described in the present application may be performed under the control of hardware processing components of the disclosed automated systems.

Figure 1:
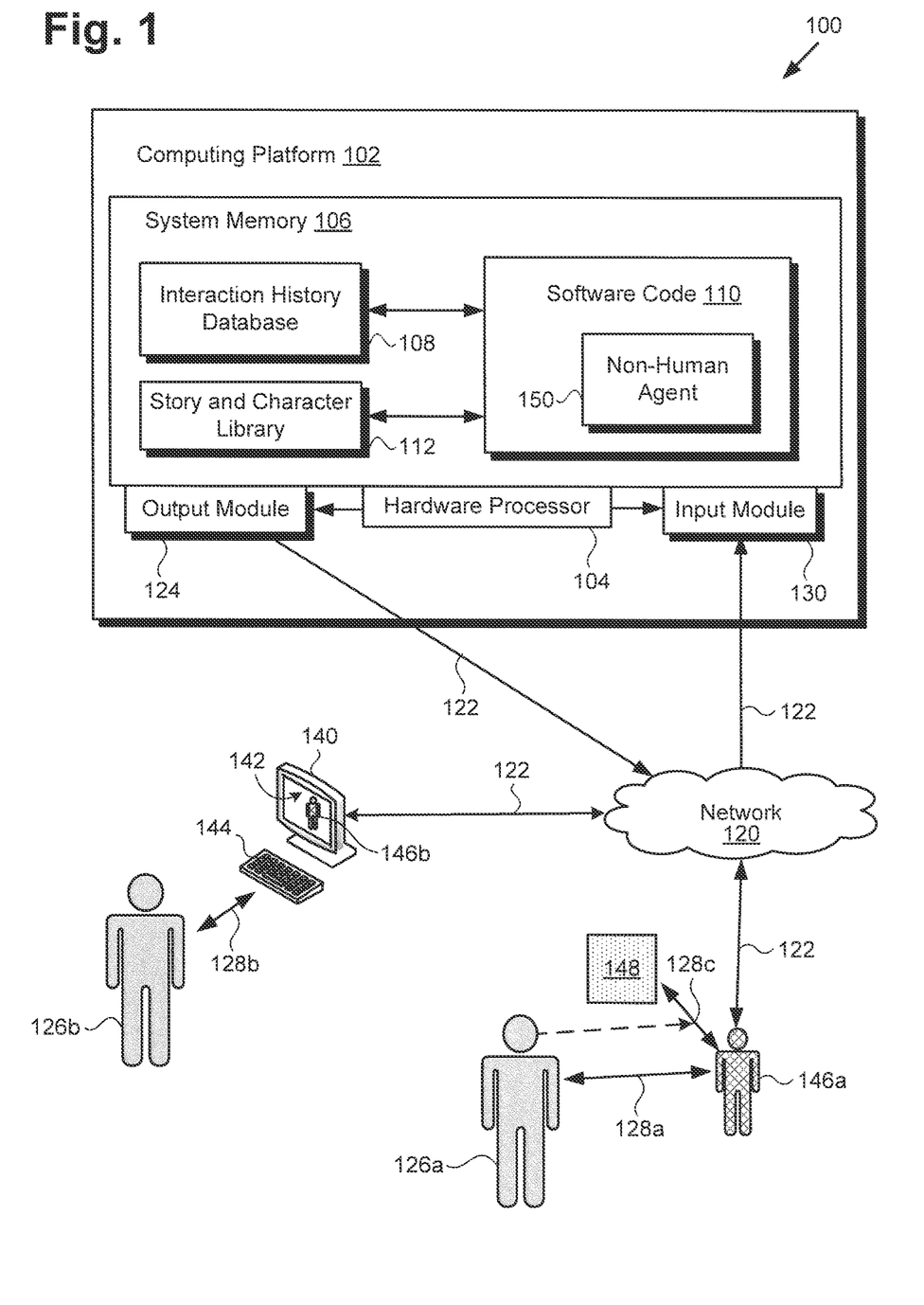
FIG. 1 shows a diagram of a system enabling a virtual agent to simulate human-like affect-driven behavior, according to one exemplary implementation.

FIG. 1 shows a diagram of a system enabling a virtual agent to simulate human-like affect-driven behavior, according to one exemplary implementation. As shown in FIG. 1, system 100 includes computing platform 102 having hardware processor 104, system memory 106 implemented as a non-transitory storage device, input module 130, and output module 124. According to the present exemplary implementation, system memory 106 stores interaction history database 108, story and character library 112, and software code 110 providing virtual social agent 150 (hereinafter "virtual agent 150").

As further shown in FIG. 1, system 100 is implemented within a use environment including communication network 120, character 146*a* in the form of a robot or other type of machine, one or more guest objects 148 (hereinafter "guest object(s) 148"), and guest system 140 including display screen 142 and optional keyboard or other input device 144. In addition, FIG. 1 shows network communication links 122 of communication network 120 interactively connecting guest system 140 and character 146*a* with system 100. Also shown in FIG. 1 is character 146*b* in the form of a virtual character rendered on display screen 142, human guest users 126*a* and 126*b* (hereinafter "guests 126*a* and 126*b*") having respective interactions 128*a* and 128*b* with respective characters 146*a* and 146*b*, and interaction 128*c* between character 146*a* and guest object(s) 148.

It is noted that, although the present application refers to software code 110 providing virtual agent 150 as being stored in system memory 106 for conceptual clarity, more generally, system memory 106 may take the form of any computer-readable non-transitory storage medium.

The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110, interaction history database 108, and story and character library 112 as being co-located in system memory 106, that representation is merely provided as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within system 100.

According to the implementation shown by FIG. 1, guest system 140 and character 146a interact with system 100 over communication network 120. In one such implementation, computing platform 102 may correspond to one or more web servers, accessible over a packet-switched network such as the Internet, for example. Alternatively, computing platform 102 may correspond to one or more computer servers supporting a local area network (LAN), or included in another type of limited distribution network, such as a private wide area network (WAN) or private cloud for example.

Although guest system 140 is shown as a desktop computer in FIG. 1, that representation is also provided merely as an example. More generally, guest system 140 may be any suitable mobile or stationary device or system that implements data processing capabilities sufficient to support connections to communication network 120, and implement the functionality ascribed to guest system 140 herein. For example, in other implementations, guest system 140 may take the form of a free standing or wall mounted display, laptop computer, tablet computer, smartphone, smart TV, or gaming console. It is noted that display screen 142 of guest system 140 may take the form of a liquid crystal display (LCD), a light-emitting diode (LED) display, an organic light-emitting diode (OLED) display, or another suitable display screen that performs a physical transformation of signals to light.

It is further noted that although FIG. 1 shows both input module 130 and output module 124 as residing on computing platform 102, that representation is also merely exemplary. In other implementations, input module 130 and/or output module 124 may be integrated with character 146a in the form of a robot or other type of machine. In other words, in some implementations, character 146a may include input module 130 and/or output module 124.

Figure 2:
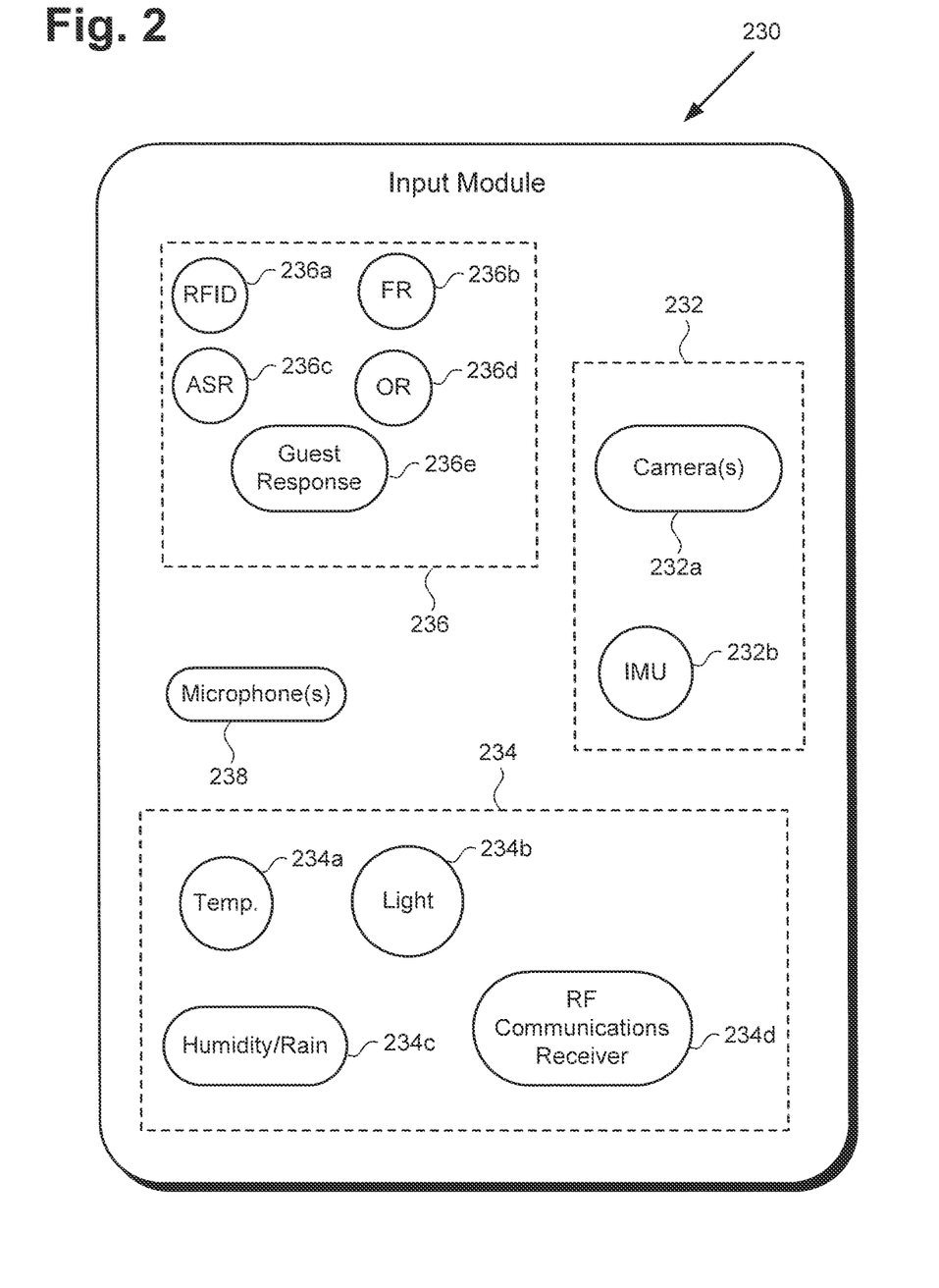
FIG. 2 shows a more detailed diagram of an input module suitable for use in the system of FIG. 1, according to one implementation.

FIG. 2 shows a more detailed diagram of input module 230 suitable for use in system 100, in FIG. 1, according to one implementation. As shown in FIG. 2, input module 230 includes multiple character sensors 232, multiple environmental sensors 234, multiple guest sensors 236, and microphone or microphones (hereinafter "microphone(s)") 238. Input module 230 corresponds in general to input module 130, in FIG. 1. Thus, input module 130 may share any of the characteristics attributed to input module 230 by the present disclosure, and vice versa.

According to the exemplary implementation shown in FIG. 2, character sensors 232 of input module 130/230 may include one or more cameras (hereinafter "camera(s)") 232a and inertial measurement unit (IMU) 232b. Camera(s) 232a may include one or more red-green-blue (RGB) still image cameras and/or one or more RGB video cameras, for example. IMU 232b may include one or more accelerometers, one or more gyroscopes, and in some implementations, a magnetometer. It is noted that the specific sensors shown to be included among character sensors 232 are merely exemplary, and in other implementations, character sensors 232 may include more, or fewer, sensors than camera(s) 232a and IMU 232b. Moreover, in other implementations, character sensors 232 may include a sensor or sensors other than camera(s) 232a and IMU 232b.

As further shown in FIG. 2, environmental sensors 234 of input module 130/230 may include temperature sensor 234a, light sensor 234b, ambient humidity/rain sensor 234c, and radio-frequency (RF) communications receiver 234d capable of receiving local weather and climate data. Analogously to character sensors 232 described above, the specific sensors shown to be included among environmental sensors 234 are merely exemplary, and in other implementations, environmental sensors 234 may include more, or fewer, sensors than temperature sensor 234a, light sensor 234b, ambient humidity/rain sensor 234c, and RF communications receiver 234d. Moreover, and also by analogy to character sensors 232, in other implementations, environmental sensors 234 may include a sensor or sensors other than temperature sensor 234a, light sensor 234b, ambient humidity/rain sensor 234c, and RF communications receiver 234d.

In one implementation, guest sensors 236 of input module 130/230 may include radio-frequency identification (RFID) sensor 236a, facial recognition (FR) sensor 236b, automatic speech recognition (ASR) sensor 236c, object recognition (OR) sensor 236d, and guest response sensor 236e. The specific sensors shown to be included among guest sensors 236 are merely exemplary, and in other implementations, guest sensors 236 may include more, or fewer, sensors than RFID sensor 236a, FR sensor 236b, ASR sensor 236c, OR sensor 236d, and guest response sensor 236e. Moreover, in other implementations, guest sensors 236 may include a sensor or sensors other than one or more of RFID sensor 236a, FR sensor 236b, ASR sensor 236c, OR sensor 236d, and guest response sensor 236e. It is noted that in some implementations, input module 130/230 may be configured to receive manual inputs from guest 126b via a computer mouse or track pad, optional keyboard 144, or a touch screen display corresponding to display screen 142.

Figure 3:
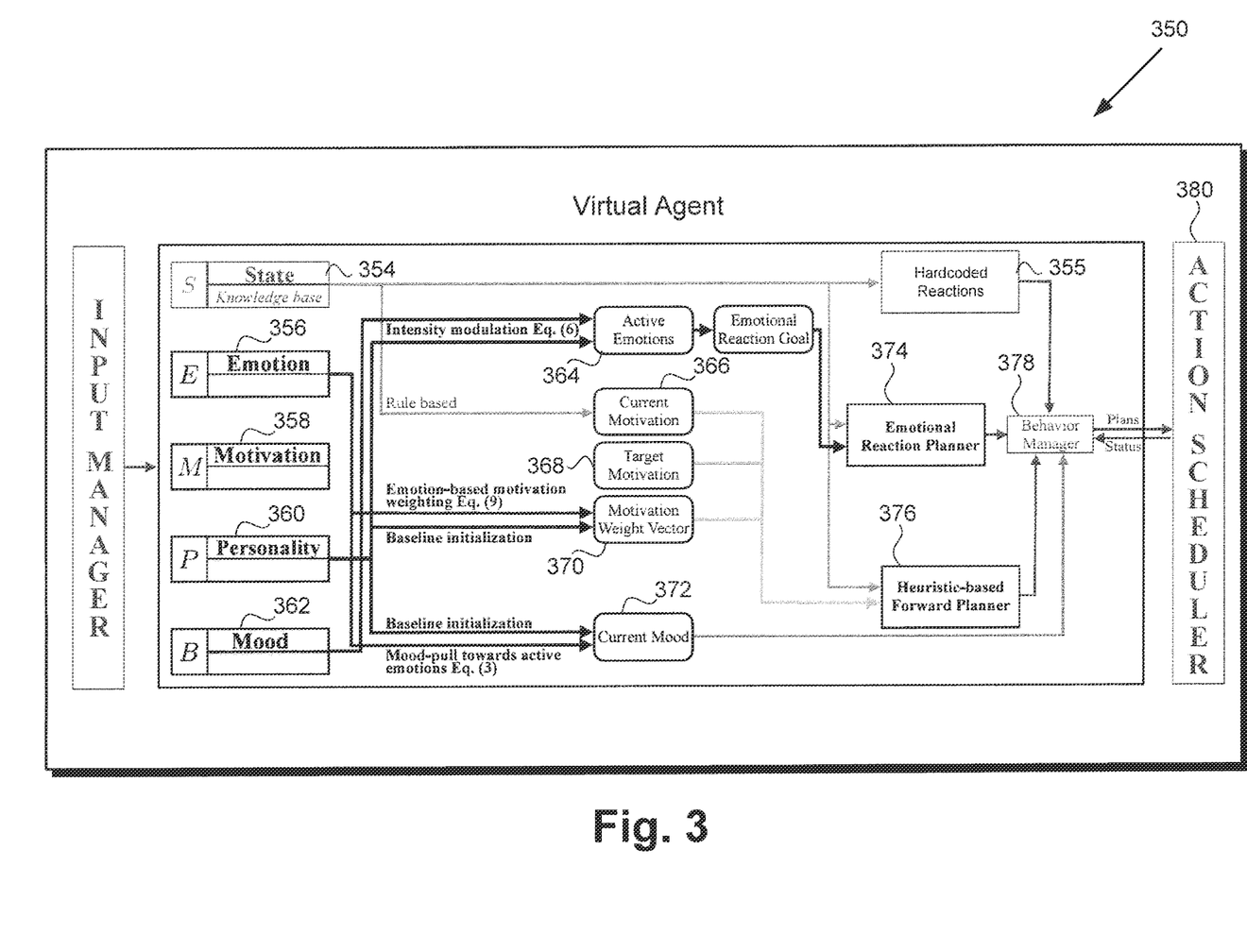
FIG. 3 shows a diagram of an exemplary virtual agent provided by the software code executed by the system of FIG. 1, according to one implementation.

FIG. 3 shows a diagram of exemplary virtual agent 350 provided by software code 100, in FIG. 1, according to one implementation. It is noted that virtual agent 350 corresponds in general to virtual agent 150, in FIG. 1. Thus, virtual agent 150 may share any of the characteristics attributed to virtual agent 350 by the present disclosure, and vice versa.

By way of overview, and referring back to FIG. 1, it is noted that, in some exemplary implementations, guests 126a and 126b may interact with respective characters 146a and 146b that may inhabit a story world (W) of a story having a timeline and a narrative arc or plot. Story world W is a blend of a virtual world and the real world, and can be changed by guests 126a and 126b as well as characters 146a and 146b. Software code 110 providing virtual agent 150/350, when executed by hardware processor 104, may control virtual agent 150/350 to simulate human-like affect-driven behavior, such as a human-like social interaction by one or both of characters 146a and 146b with respective guests 126a and 126b.

It is further noted that, in some implementations, characters 146a and 146b may be different characters, while in other implementations, characters 146a and 146b may be different versions or instantiations of the same character. It is also noted that, in some implementations, even in lieu of an interaction between a character and one or more guests or guest object(s), the affective state of the character, including for example a personality profile, a mood, a physical state, an emotional state, and a motivational state of the character, can continue to evolve with advancement of the story including the character.

According to the exemplary implementation shown in FIG. 3, virtual agent 150/350 determines the behavior of a character, i.e., one of characters 146a and 146b based on the affective parameters Emotion 356 (E), Motivation 358 (M), Personality 360 (P), and Mood 362 (B), as well as the State 354 (S) of that character. Each of the affective parameters Emotion 356, Motivation 358, Personality 360, and Mood 362 is discussed in detail below.

With respect to the state 354 of a character, it is noted that state 354 combines a description of the story world (the world state) and a description of the character's physical state. The world state may be represented by an ever updating knowledge base (KB). For example, virtual agent 150/350 transforms the sensory signals received from input module 130/230 into domain knowledge including states corresponding to all objects in the story world W (including guests) that are perceivable to a character. The physical state may be represented by continuous variables that model the internal physical conditions of the character, e.g., such as hunger or tiredness.

The characters, e.g., characters 146a and 146b are under the control of system 100 and live only in the virtual world. The guests, e.g., guests 126a and 126b are not controlled by the system and interact with the characters from the real world. It is noted that guest object(s) 148 is something of a hybrid. For example, in some implementations, guest object(s) 148 may be one or more inanimate or non-autonomous object. However, in other implementations, like characters 146a and 146b, guest object(s) 148 may be one or more characters under the control of system 100, such as one or more characters in the form of a robot of other machine and/or one or more virtual characters rendered on a display screen, that nevertheless assumes the role of a guest in an interaction with character 146a or 146b. It is emphasized that creating a believable control of the characters for the guests is the main objective of virtual agent 150/350.

The KB of a character can change if a change in the world is perceived by the character, e.g., through a volitional act by guest 126a or 126b or the character, or through a non-volitional act by the environment. The KB of the character can also be changed directly by the character, e.g., by asserting something to be true, planning something, deriving a fact, and so forth.

Personality 360 (P): The personality 360 of a character may be modeled using the five-factor model (FFM) known in the art. The FFM applies the five factors: 1) Openness to new experience, 2) Conscientiousness, 3) Extraversion, 4) Agreeableness, and 5) Neuroticism to characterize a personality. Due to the five specific factors applied, the FFM is also referred to as the OCEAN model. Personality 360 can be modeled as a vector $p \in P$, where each trait $p_i$ is assigned a value between [0, 1]. The personality 360 of a character influences its emotional state and behavior. It is noted that although the present implementation five-factor OCEAN model of personality, in other implementations, other personality models known in the art may be utilized.

Motivation 358 (M): The motivations of a character can be modeled based on the Reiss Motivation Profile (RMP™), known in the art. According to Reiss, there are sixteen fundamental motivations: Power, Curiosity, Independence, Status, Social contact, Vengeance, Honor, Idealism, Physical exercise, Romance, Family, Order, Eating, Acceptance, Tranquility, and Saving. Referring to FIG. 3, the motivational state of a character can be modeled using two 16-dimensional vectors. One of the vectors, $m^c \in M$, represents the current state 366 of motivational fulfillment of the character, and the other vector, $m^d \in M$, represents the target state 368 of motivational fulfillment of the character. Each dimension of these vectors corresponds to one of the Reiss fundamental motivations and is assigned a value between [0,1], and the character seeks to minimize the distance between $m^d$ and $m^c$, i.e., the difference between its target state of motivational fulfillment and its current state of motivational fulfillment.

According to some implementations, forward planner 376 with an A* heuristic search algorithm is used to produce a plan $\pi_{A^*}$ to move current state 366 of motivational fulfillment closer to target state 368. The heuristic may be expressed as a weighted distance between the two motivational vectors, $m^c$ and $m^d$.

$$d(m^c, m^d, w) = \left( \sum_{i=1}^{16} w_i \cdot (m_i^d - m_i^c)^2 \right)^{1/2},$$ (Equation 1)

where motivation weight vector 370, w, defines the importance given to each of the dimensional values, as determined by the personality and emotional state of the character. As noted above, the distance between $m^d$ and $m^c$ represents how far the character is from fulfilling its motivations, and the search algorithm attempts to choose behaviors that decrease this distance. Once the heuristic search has found a plan that adequately satisfies current motivations with respect to target motivations, the plan $\pi_{A^*}$ is sent to behavior manager 378.

It is noted that the heuristic expressed as Equation 1 is merely provided as an example. In other implementations, another heuristic could be utilized, provided that other heuristic captures the influence of personality and correlates with distance between target state 368 of motivational fulfillment and current state 366 of motivational fulfillment of the character.

Emotion 356 (E): Emotions reflect a short-term affect that arises as a result of stimuli from the environment of a character. In one implementation, a set of predetermined rules may be used to map State 354 of the character to an instance of emotion type $e_i \in E$ and its intensity $I(e_i)$. The twenty-one emotion types $e_i$ in the OCC theory of Ortony, Clore, and Collins (hereinafter "OCC emotions") may be used and may be differentiated by i. After an emotion $e_i$ is generated at time $t_0$ and assigned an initial intensity $I_{t_0}(e_i)$, that intensity may decay as a function of time according to:

$$I_t(e_i) = I_{t_0}(e_i) \cdot e^{-\beta(t-t0)},$$ (Equation 2)

where the constant β determines how fast the intensity of the particular emotion $e_i$ will decrease over time. Once an emotion is generated, it is stored in the list of active emotions 364 (ϵ) until its intensity falls below a predetermined threshold near zero. It is noted that, as discussed in greater detail below, the initial intensity of an emotion, $I_{t_0}(e_i)$, is modulated by the personality traits p and current mood b of a character.

Virtual agent 150/350 monitors the intensity of active emotions (364) ϵ, and when the intensity of $e_i \in \epsilon$ crosses an emotional threshold $\tau_e$ (i.e., $I(e_i) > \tau_e$), virtual agent 150/350 propagates a goal $g_{e_i}$=(emotionalreaction$e_i$) to emotional reaction planner 374 to produce an appropriate plan $\pi_{GP}$ ($g_{e_i}$). Compared to heuristic based forward planner 376, emotional reaction planner 374 does not operate in the 16-dimensional motivation space, but rather has a fixed goal in the State 354 space of the character and operates in a conventional Stanford Research Institute Problem Solver (STRIPS) style backward search.

State 354 (S): State 354 includes both a representation of the current physical state of the character and a representation of the story world in the form of a knowledge base (KB). For example, a physical state manager may track variables that describe the physical condition of the character, such as tiredness, depth-of-sleep, hunger, and the like. Generally, these physical states are continuous variables that are modeled by an internal dynamical system. Additionally, the dynamical system may be influenced by external stimuli (e.g., hunger can be reduced by the behavior of eating, or increase when a nice meal is perceived, visually or through smell). Physical states are responsible for creating behavioral triggers, and may also be used to influence the KB. These triggers can directly result in producing hardcoded reactions 355. The state of the KB is used in the planning process as it determines when an action can be applied, which may be modeled with a precondition, and it is used to describe the outcome of an action, which may be modeled with a postcondition. It is noted that this includes the planning process of heuristic based forward planner 376 and the planning process of emotional reaction planner 374.

Figure 4:
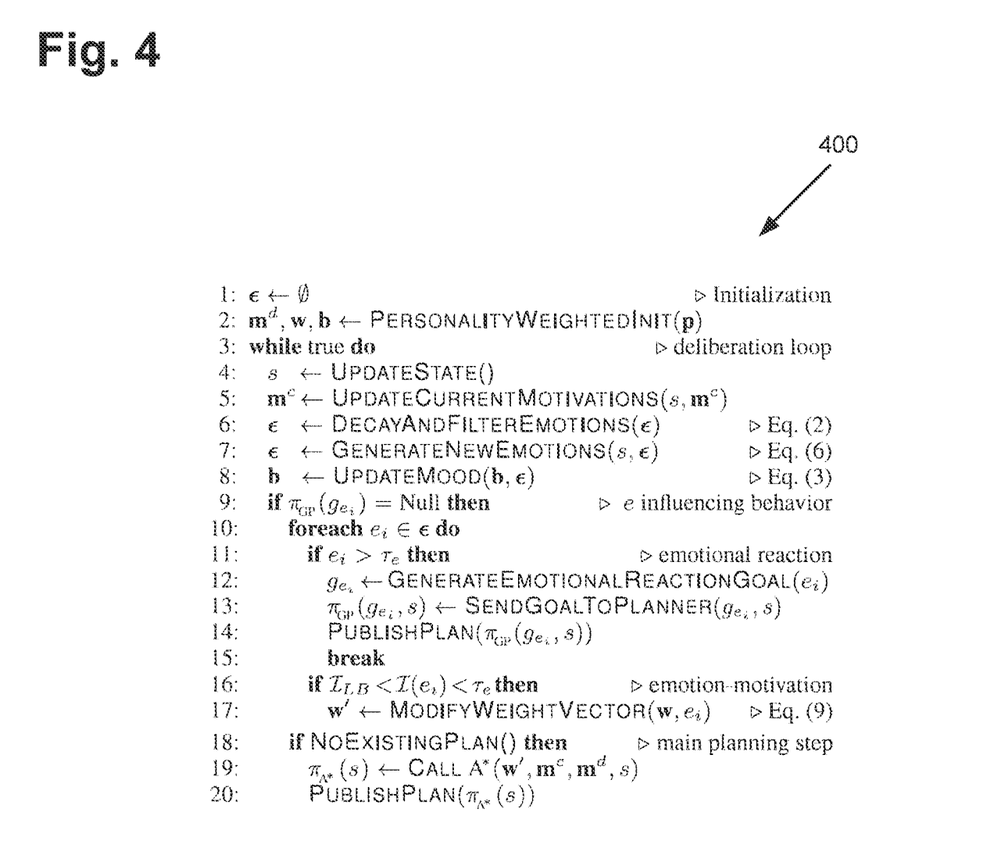
FIG. 4 presents pseudocode for an exemplary deliberation algorithm utilized by the virtual agent of FIG. 3, according to one implementation.

FIG. 4 presents pseudocode for exemplary deliberation algorithm 400 utilized by virtual 150/350, according to one implementation, that more formally describes the deliberations associated with plans $\pi_{A^*}$ and $\pi_{GP}$. It is noted that at every time step of deliberation algorithm 400, active emotions 364 ($\epsilon$) are decayed and filtered, while newly generated emotions are added. If a sufficiently intense emotion is present, an emotional reaction $\pi_{GP}$ could be planned for, or, alternatively, motivation weight vector 370 (w) could be modified based on the experienced emotion. If an emotional reaction is not underway, forward planner 376 (A*) is tasked with finding a motivationally driven plan $\pi_{A^*}$ based on Equation 1.

Mood 362 (B): Mood 362 is distinguished from emotion 356 by its resolution and relative stability over time. The mood of a character b∈B can be described using three traits: Pleasure (P), Arousal (A), and Dominance (D) as a vector in Pleasure-Arousal-Dominance space (PAD space) where each dimension ranges from negative one to one (–1-1). In addition, a baseline or default mood ($b_0$) of the character is identified based on a mapping between the FFM personality traits of the character and the PAD space. For example, the following mapping developed by Gebhard, known in the art, may be utilized:

Pleasure=0.21*Extraversion+0.59*Agreeableness+0.19*Neuroticism

Arousal=0.15*Openness+0.30*Agreeableness–0.57*Neuroticism

Dominance=0.25*Openness+0.17*Conscientiousness+0.60*Extraversion–0.32*Agreeableness The mood of a character at a given time (i.e., current mood 372 ($b_t$)) is determined by the baseline mood and active emotions of the character. Because mood 362 is modeled in PAD space and the OCC emotion types represent the emotions, the emotions can be mapped to the PAD space: $\phi(e)$: E→B, where B=PAD. Once the emotions are represented in PAD space, they can be combined to describe an effective mood ($b_t^{eff}$), which is used at each time step t to "pull" on the current mood $b_t$:

$$b_t = (1-\alpha) \cdot b_{t-1} + \alpha \cdot b_t^{eff}. \quad \text{(Equation 3)}$$

where $\alpha$ parameterizes the strength of the pull mechanism. It is noted that in one implementation $\alpha$ is approximately 0.01. The effective mood is determined based on the default mood of the character, which incorporates the personality 360 of the character, and the set of all currently active emotions:

$$b_t^{eff} = \omega_0 \cdot b_0 + \Sigma_{i \in E} \omega_i^{eff}(t) \cdot \phi(e_i), \quad \text{(Equation 4)}$$

$$\omega_i^{eff}(t) = \min(1, \Sigma_{e_j \in \epsilon} I_t(e_j) \mathbb{1}(e_i, e_j)), \quad \text{(Equation 5)}$$

where $\omega_0$ is a weighting of the baseline mood, j iterates over all active emotions $\epsilon$, $\phi(e_i)$ is the mapping of the i'th emotion to the PAD space, and $\mathbb{1}(e_i, e_j)$ is an indicator function equal to one when i=j, and equal to zero when i≠j. Thus, mood 362 is pulled toward the point in PAD space that reflects the joint set of all currently active emotions and the default mood of the character. Consequently, when in isolation, the mood 362 of the character will converge to the baseline mood.

Figure 5:
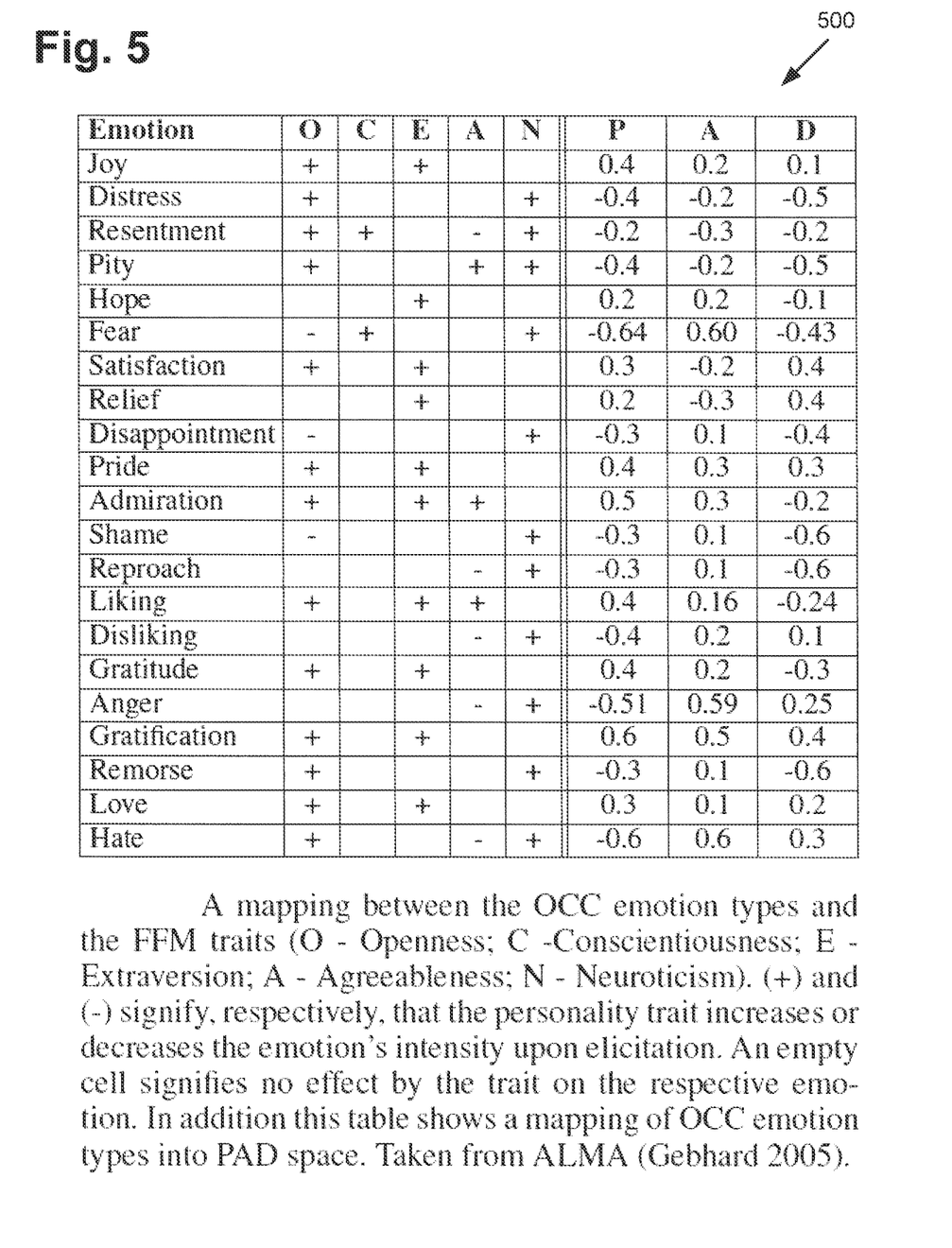
FIG. 5 shows a table presenting an exemplary mapping between personality and emotion.

As defined above by Equation 2, the intensity of an active emotion exponentially decays over time $I_{t_0}$. However, the initial strength of the emotion can vary widely between the different emotions $e_i$. That variation can be captured based on the predetermined emotional trigger that generates the emotion, the current mood, and the personality:

$$I_{t_0}(e_i) = I_k \cdot (I_{b \to e_i} + I_{p \to e_i})/2, \quad \text{(Equation 6)}$$

where $I_k$ describes the predetermined strength of the k'th emotional trigger, $I_{b \to e_i}$ and $I_{p \to e_i}$ are multiplicative influences based on the respective mood and personality of the character. While the emotional trigger typically holds the most influence over the intensity of an emotion, the influence of the character's mood and personality over the intensity offers an empirically-based way to incorporate differences between characters, as well as varying emotional context. To that end, the following equations may be used:

$$I_{b \to e_i} = 1 + |b_t| \mathbb{1}(\phi(\overline{e_i}), \overline{b_t}) \mathbb{1}(\phi(\overline{e_i}), -\overline{b_t})) \quad \text{(Equation 7)}$$

$$I_{p \to e_i} = 1 + \Sigma_{j \in P} p_j \mathcal{X}(p_j, e_i), \quad \text{(Equation 8)}$$

where $\overline{b}$ encodes the discretization of the PAD position to the corresponding mood-octant ($-\overline{b}$ corresponds to the inverse octant) $p_j$ is the j'th parameter of the FFM personality traits of the character, and $\mathcal{X}$ is the mapping between personality and emotion shown by table 500 in FIG. 5.

It is noted that while Equations 7 and 8 can be replaced with other formalisms, it is advantageous to utilize formalisms that, like Equations 7 and 8, are able to capture the main empirically-based influences of various affective components on emotion. That is to say: (a) the intensity of an experienced emotion that is close to current mood 372 is strengthened (or weakened if the experienced emotion is far from current mood 372), and (b) the personality of a character can up or down regulate an emotion. Moreover, by modeling the influence of mood on emotion, the mood of the character influences behavior through the emotional state of the character. For example, if a character experiences a negative emotion while already in a bad mood, the mood might enhance the intensity of the emotion and drive the character to an emotional reaction. Alternatively, the character might behave by regulating the emotion if its mood is such that the intensity of the emotion is attenuated.

The emotions 356 experienced by a character can also affect the motivational state of the character by changing the motivation weight vector 370, w, included in Equation 1. Formally, the motivation weight vector is modified, w→w', to influence the motivational heuristic used by forward planner 376. An emotional intensity range may be defined,

[$I_{LB}$, $\tau_e$], within which w is influenced, where $I_{LB}$ and $\tau_e$, respectively, are the lower and upper bounds of the range.

Figure 6:
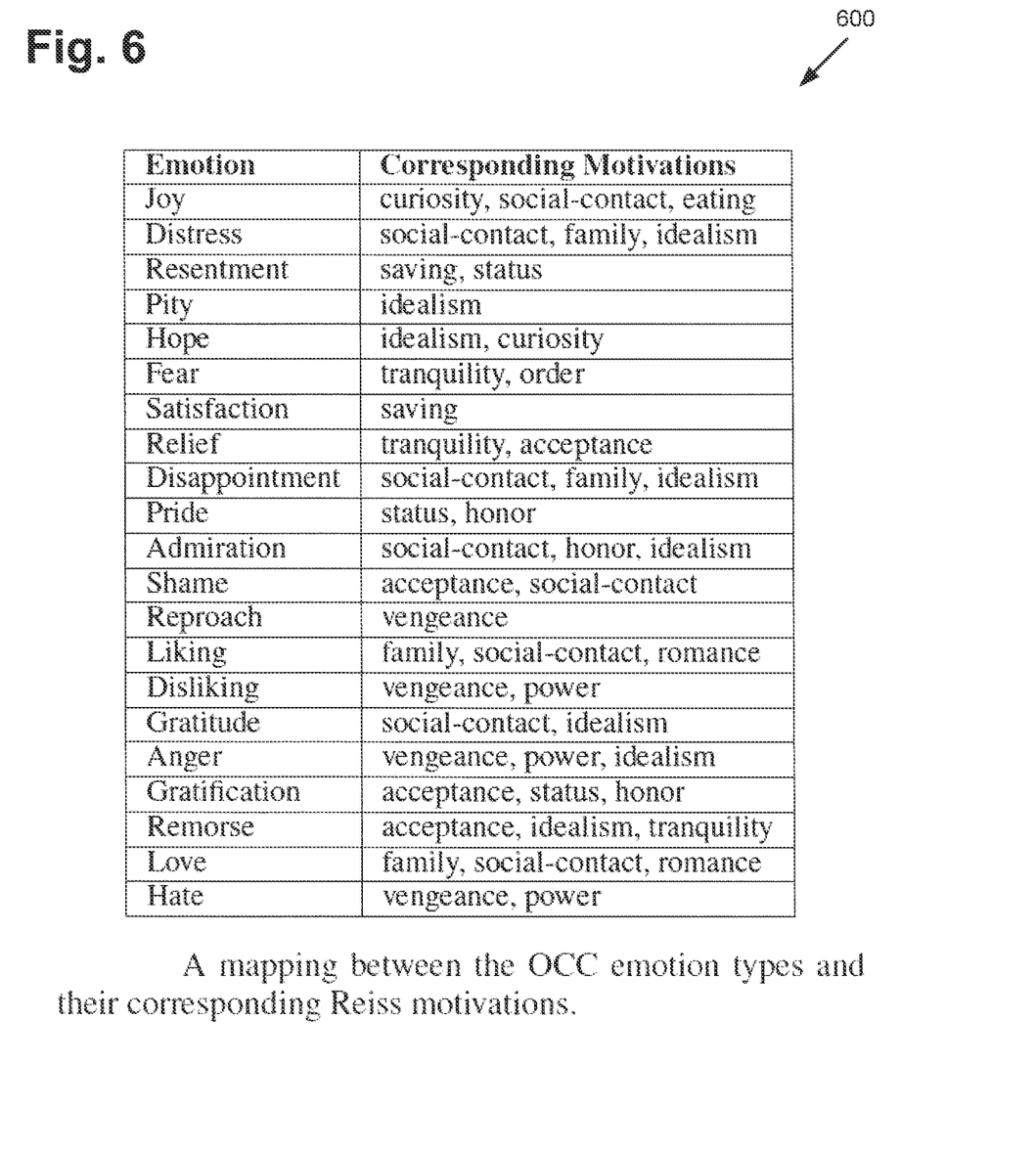
FIG. 6 shows a table presenting an exemplary correspondence between emotions and motivations.

It is noted that, if the intensity of an emotion exceeds $\tau_e$, an emotional reaction is triggered, as discussed above. As the intensity of the emotion decays, as shown for example by Equation 2, its weighting of the motivational dimensions of w' weakens, i.e., w' converges back to w. If an emotion, $e_i$, has an intensity that is within the defined range (i.e., $I_{LB} < I_t(e_i) < \tau_e$), the modified weight vector may be defined as:

$$w'_i = \begin{cases} w_i \cdot (1 + (I_t(e_i) - I_{LB})) & \text{if } i \in \zeta_{M,e_i} \\ w_i \cdot (1 - (I_t(e_i) - I_{LB})) & \text{if } i \notin \zeta_{M,e_i} \end{cases}, \quad \text{(Equation 9)}$$

where $\zeta_{M,e_i}$ represents the set of corresponding motivations of the emotion e, according to the correspondence between emotions and motivations shown by table 600 in FIG. 6.

The foregoing model for simulating human-like affect-driven behavior will be further described by reference to FIG. 7, which shows flowchart 790 presenting an exemplary method for enabling virtual agent 150/350 to simulate a human interaction, according to one implementation. With respect to the method outlined in FIG. 7, it is noted that certain details and features have been left out of flowchart 790 in order not to obscure the discussion of the inventive features in the present application. It is noted that as used hereinafter in the present disclosure and the claims appended thereto, the term "guest" may refer to guest 126*a*, guest 126*b*, a group of human guests, e.g., guests 126*a* and 126*b* sharing a common location, or to guest object(s) 148.

Figure 7:
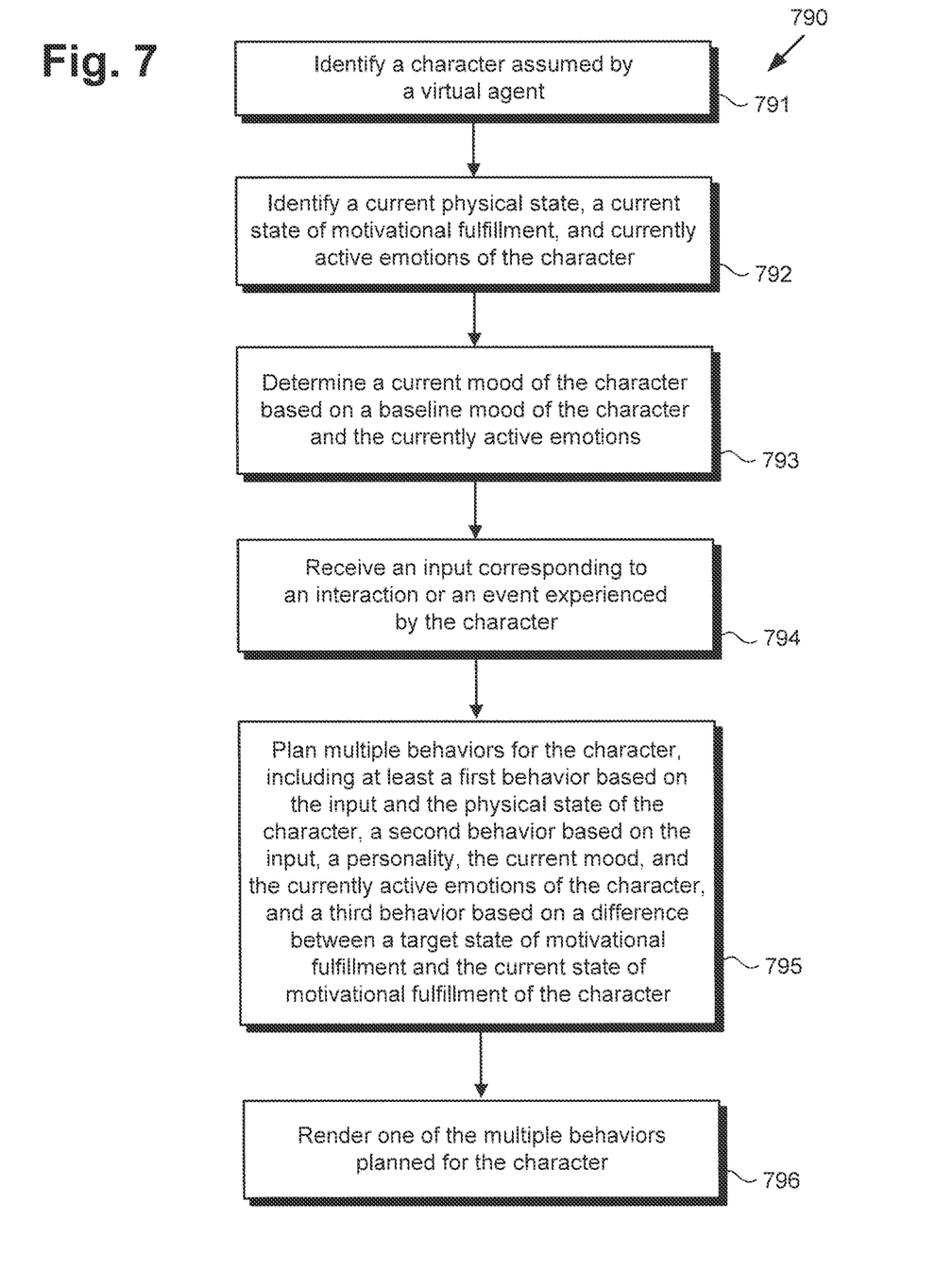
FIG. 7 shows a flowchart presenting an exemplary method for enabling a virtual agent to simulate human-like affect-driven behavior, according to one implementation.

Referring to FIG. 7 in combination with FIGS. 1, 2, and 3, flowchart 790 begins with identifying character 146*a*/146*b* assumed by virtual agent 150/350 (action 791). Identification of character 146*a*/146*b* includes identification of the affective qualities of character 146*a*/146*b*, such as personality 360, target state 368 of motivational fulfillment, baseline mood 362, and emotions 356 of character 146*a*/146*b*. Identification of character 146*a*/146*b* may be performed by software code 110, executed by hardware processor 104, by reference to story and character library 112 and based on character 146*a*/146*b* assumed by virtual agent 150/350. For example, story and character library 112 may include character profiles for each character assumable by virtual agent 150/350 and including information describing the personality 360, target state 368 of motivational fulfillment, baseline mood 362, and emotions 356 of each character.

Flowchart 790 continues with identifying current physical state 354, current state 366 of motivational fulfillment, and currently active emotions 364 of character 146*a*/146*b* (action 792). Identification of current physical state 354, current state 366 of motivational fulfillment, and currently active emotions 364 of character 146*a*/146*b* may be performed by virtual agent 150/350, under the control of software code 110 executed by hardware processor 104.

For example, and as noted above, identification of current physical state 354 can be performed by tracking variables that describe the physical condition of character 146*a*/146*b*, such as tiredness, depth-of-sleep, hunger, and the like. Identification of current state 366 of motivational fulfillment of character 146*a*/146*b* may be performed based on Equation 1, described above, and may further based on the modification to the motivation weight vector 370, w→w', introduced by Equation 9, also described above. Identification of currently active emotions 364 of character 146*a*/146*b* may be performed based on Equation 2 and/or Equation 6 described above.

Flowchart 790 continues with determining current mood 372 of character 146*a*/146*b* based on baseline mood 362 and currently active emotions 364 of character 146*a*/146*b* (action 793). Determination of current mood 372 of character 146*a*/146*b* may be performed by virtual agent 150/350, under the control of software code 110 executed by hardware processor 104. For example, current mood 372 of character 146*a*/146*b* may be determined based on Equation 3, described above.

Flowchart 790 continues with receiving an input corresponding to an interaction or an event experienced by character 146*a*/146*b* (action 794). In some implementations, the input received in action 794 may be detection data indicating the presence of guest 126*a*/126*b* or guest object(s) 148. As noted above, input module 130/230 may include one or more guest sensors 236, such as RFID sensor 236*a*, FR sensor 236*b*, ASR sensor 236*c*, OR sensor 236*d*, and/or guest response sensor 236*e*. As a result, guest 126*a*/126*b* or guest object(s) 148 may be detected based on detection data in the form of sensor data produced by one or more of guest sensors 236. In addition, or alternatively, in some implementations input module 130/230 may include microphone(s) 238. In those latter implementations, guest 126*a*/126*b* or guest object(s) 148 may be detected based on speech of guest 126*a*/126*b* or guest object(s) 148 received by microphone (238).

For example, in some implementations, guest object(s) 148 may be an inanimate or non-autonomous object, such as a coffee cup. In those implementations, guest object(s) 148 may be detected using RFID sensor 236*a* or OR sensor 236*d*, for example. In other implementations, guest object(s) 148 may be one or more other characters, such as one or more characters in the form of a robot of other machine and/or one or more virtual characters rendered on a display screen. In those implementations, guest object(s) 148 may be detected using one, some, or all of RFID sensor 236*a*, FR sensor 236*b*, ASR sensor 236*c*, OR sensor 236*d*, and/or guest response sensor 236*e*. Moreover, in implementations in which guest object(s) 148 is/are capable of generating speech, guest object(s) 148 may be detected based on speech of guest object(s) 148 received by microphone(s) 238.

In implementations in which virtual character 146*b* interacts with guest 126*b*, detection of guest 126*b* may be performed based on one or more inputs to guest system 140. For example, guest 126*b* may be detected based on one or more inputs to keyboard 144 or display screen 142 by guest 126*b*. Receiving the input in action 794, may be performed by software code 110, executed by hardware processor 104, and using input module 130/230.

It is noted that, in some implementations, action 794 may include identifying guest 126*a*/126*b* or guest object(s) 148. As discussed above, the presence of guest 126*a*/126*b* or guest object(s) 148 can be detected based on sensor data received from input module 130/230. That sensor data may also be used to reference interaction history database 108 to identify guest 126*a*/126*b* or guest object(s) 148. Thus, identification of guest 126*a*/126*b* or guest object(s) 148 may be performed by software code 110, executed by hardware processor 104, and using input module 130/230 and interaction history database 108.

It is noted that virtual agent 150/350 may make preliminary determinations regarding identification of human guest 126*a*/126*b* based on data retained from previous interactions, such as the day of the week, time of day, weather conditions, or other contextual cues, for example. In addition, or alternatively, human guest 126a/126b may carry a unique identifier, such as an RFID tag worn as a pin or bracelet and enabling virtual agent 150/350 to distinguish human guest 126a/126b from other humans.

In some implementations, action 794 also includes obtaining the interaction history of character 146a/146b with guest 126a/126b or guest object(s) 148 (action 685). The interaction history of character 146a/146b with guest 126a/126b or guest object(s) 148 may be obtained from interaction history database 108 by software code 110, executed by hardware processor 104. It is noted that although virtual agent 150/350 and/or interaction history database 108 may retain data enabling the virtual agent 150/350 to "identify" human guest 126a/126b with whom virtual agent 150/350 interacts, the data retained is exclusive of personally identifiable information (PII) of human guest 126a/126b. Thus, although virtual agent 150/350 is typically able to distinguish one anonymous human guest with whom a previous character interaction has occurred from another, as well as from anonymous human guests having no previous interaction experience with the character, the present simulated human interaction solutions do not retain information describing the age, gender, race, ethnicity, or any other PII of human guests 126a/126b with whom virtual agent 150/350 interacts. In other words, virtual agent 150/350 may, in effect, be able to "identify" guest 126a/126b as distinguishable from other guests, while the real-world identity or other PII of human guest 126a/126b remains unknown to system 100.

Flowchart 790 continues with planning multiple behaviors including at least a first behavior, a second behavior, and a third behavior for character 146a/146b (action 795). The first behavior may correspond to hardcoded reaction 355, and may be based on the input received in action 794 and the current physical state of character 146a/146b. The second behavior may correspond to an emotional reaction by character 146a/146b and may be based on the input received in action 794, as well as personality 360, current mood 372, and active emotions 364 of character 146a/146b. The second behavior may be expressed as emotional reaction plan $\pi_{GP}$, described above, and generated by emotional reaction planner 374.

By contrast, the third behavior may be a motivationally influenced behavior based on the difference between target state 368 of motivational fulfillment and current state 366 of motivational fulfillment. The third behavior may be expressed as motivationally inspired plan $\pi_{A*}$, described above, and generated by heuristic-based forward planner 376. Planning of the multiple behaviors for character 146a/146b in action 795 may be performed by virtual agent 150/350, under the control of software code 110 executed by hardware processor 104.

The first, and/or second, and/or third behaviors for character 146a/146b planned in action 795 may include an interaction with human guests 126a/126b or guest object 148 in the form of another character. In those implementations, the first, and/or second, and/or third behavior for character 146a/146b may be one or more of a language-based communication, such as speech or written text, a body movement such as a gesture, and a facial expression.

As noted above, in some implementations, character 146a may be a machine, such as a robot, for example. In those implementations, the first, and/or second, and/or third behavior planned for character 146a may be an interaction with a virtual object or other real object, modeled in the story world. As also noted above, in some implementations, character 146b may be a virtual character rendered on display screen 142. In those implementations, the first, and/or second, and/or third behavior planned for character 146b may be an interaction with a virtual object. However, it is noted that when rendered as a virtual character on display screen 142, an interaction by character 146b with a virtual object may affect the real world. For example, character 146b rendered as a virtual character on display screen 142 may press a virtual button that results in a real world machine, such as a coffee maker for instance, being turned on or off.

Flowchart 790 can conclude with rendering one of the multiple behaviors planned for character 146a/146b (action 796). For example, hardware processor 104 may execute software code 110 to render one of the behaviors planned in action 795 via action scheduler 380 of virtual agent 150/350 and output module 124. It is noted that, in some implementations, the multiple behaviors planned in action 795 may be sent to behavior manager 378 configured to schedule the behaviors with respect to one or more of a priority associated respectively with the behaviors, conflicts amongst the behaviors, and/or conflicts with a behavior plan currently being executed. Alternatively, or in addition, behavior manager 378 may utilize another type of behavior selection strategy, such as optimizing progress towards the achievement of short term or long term goals of character 146a/146b.

In some implementations, as noted above, the behaviors planned in action 795 may include a language-based communication by character 146a/146b. In those implementations, output module 124 may provide data enabling the rendering of text on display screen 142, or enabling speech by an audio output device integrated with character 146a in the form of a robot or other type of machine. According to some implementations, the behaviors planned in action 795 may include a facial expression, gesture, or other movement by character 146a/146b. In those implementations, hardware processor 104 may execute software code 110 to cause character 146a/146b to perform the behavior.

Moreover, in some implementations, hardware processor 104 may execute software code 110 to learn from the behavior rendered in action 796 in order to improve the performance of virtual agent 150/350. For example, in one implementation, hardware processor 104 may execute software code 110 to detect a response by guest 126a/126b or guest object(s) 148 to the behavior rendered in action 796, via guest response sensor 236e, for example, and to generate an updated present status of character 146a/146b and an updated interaction history of character 146a/146b with guest 126a/126b or guest object(s) 148.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for simulating a human-like behavior of a virtual agent for interacting with a human, the system comprising:
   a computing platform including a hardware processor and a system memory;
   a software code stored in the system memory; and
   an interaction history database stored in the system memory, the interaction history database including a history of interactions between the virtual agent and the human;
   wherein the hardware processor is configured to execute the software code to:
      distinguish the human from other guests based on the history of interactions between the virtual agent and the human in addition to or as an alternative to using a unique identifier associated with the human, wherein the history of interactions between the virtual agent and the human omits any personally identifiable information (PII) of the human;
      identify an agent character to be assumed by the virtual agent, the agent character having an agent personality and agent emotions;
      obtain, from the system memory, the interaction history database including the history of interactions between the virtual agent and the human;
      plan, based on the history of interactions between the virtual agent and the human, a plurality of character behaviors including a first behavior and a second behavior for the agent character, wherein the first behavior is further planned based on a current physical state of the agent character, wherein the second behavior is an affect-driven behavior further planned based on the agent personality and the agent emotions, and wherein at least one of the first behavior or the second behavior comprises an interaction with another character having another personality and other emotions; and
      execute one or more of the plurality of character behaviors for the virtual agent when interacting with the human.

2. The system of claim 1, wherein the at least one of the first behavior or the second behavior comprises the interaction with the another character formed as a machine.

3. The system of claim 1, wherein the at least one of the first behavior or the second behavior comprises at least one of a language-based communication, a gesture, or a facial expression by the agent character.

4. The system of claim 1, wherein the agent character assumed by the virtual agent is independent of a personality of the human.

5. The system of claim 1, wherein the at least one of the first behavior or the second behavior comprises another interaction with an inanimate real object.

6. The system of claim 1, wherein the agent character is rendered on a display, and wherein a real-world identity of the human remains unknown to the system.

7. The system of claim 1, wherein the at least one of the first behavior or the second behavior comprises another interaction with a virtual object, the interaction with the virtual object causing a real world event to occur.

8. The system of claim 1, wherein the human is distinguished from the other guests based on the history of interactions between the virtual agent and the human, as the alternative to using the unique identifier associated with the human.

9. The system of claim 1, wherein the history of interactions includes one or more contextual cues used to distinguish the human from the other guests.

10. The system of claim 9, wherein the one or more contextual cues include at least one of a day of a week, a time of a day or weather conditions when the interaction between the virtual agent and the human occurred.

11. A method for use by a system to simulate a human-like behavior of a virtual agent for interacting with a human, the system including an interaction history database having a history of interactions between the virtual agent and the human, the method comprising:
   distinguishing the human from other guests based on the history of interactions between the virtual agent and the human in addition to or as an alternative to using a unique identifier associated with the human, wherein the history of interactions between the virtual agent and the human omits any personally identifiable information (PII) of the human;
   identifying an agent character to be assumed by the virtual agent, the agent character having an agent personality and agent emotions;
   obtaining the interaction history database including the history of interactions between the virtual agent and the human;
   planning, based on the history of interactions between the virtual agent and the human, a plurality of character behaviors including a first behavior and a second behavior for the agent character, wherein the first behavior is further planned based on a current physical state of the agent character, wherein the second behavior is an affect-driven behavior further planned based on the agent personality and the agent emotions, and wherein at least one of the first behavior or the second behavior comprises an interaction with another character having another personality and other emotions; and
   executing one or more of the plurality of character behaviors for the virtual agent when interacting with the human.

12. The method of claim 11, wherein the at least one of the first behavior or the second behavior comprises the interaction with the another character formed as a machine.

13. The method of claim 11, wherein the at least one of the first behavior or the second behavior comprises at least one of a language-based communication, a gesture, or a facial expression by the agent character.

14. The method of claim 11, wherein the agent character assumed by the virtual agent is independent of a personality of the human.

15. The method of claim 11, wherein the at least one of the first behavior or the second behavior comprises another interaction with an inanimate real object.

16. The method of claim 11, wherein the agent character is rendered on a display, and wherein a real-world identity of the human remains unknown to the system.

17. The method of claim 11, wherein the at least one of the first behavior or the second behavior comprises another interaction with a virtual object, the interaction with the virtual object causing a real world event to occur.

18. The method of claim 11, wherein the human is distinguished from the other guests based on the history of interactions between the virtual agent and the human, as the alternative to using the unique identifier associated with the human.

19. The method of claim 11, wherein the history of interactions includes one or more contextual cues used to distinguish the human from the other guests.

20. The method of claim 19, wherein the one or more contextual cues include at least one of a day of a week, a time of a day or weather conditions when the interaction between the virtual agent and the human occurred.

* * * * *